US009482974B2

(12) United States Patent
Martin

(10) Patent No.: US 9,482,974 B2
(45) Date of Patent: *Nov. 1, 2016

(54) PART MATERIAL FOR ELECTROPHOTOGRAPHY-BASED ADDITIVE MANUFACTURING

(71) Applicant: Stratasys, Inc., Eden Prairie, MN (US)

(72) Inventor: Trevor I. Martin, Burlington (CA)

(73) Assignee: Stratasys, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,318

(22) Filed: Apr. 20, 2015

(65) Prior Publication Data

US 2015/0227070 A1    Aug. 13, 2015

Related U.S. Application Data

(63) Continuation of application No. 13/944,472, filed on Jul. 17, 2013, now Pat. No. 9,023,566.

(51) Int. Cl.
*G03G 9/087*    (2006.01)
*G03G 9/097*    (2006.01)
*G03G 9/08*     (2006.01)
*G03G 9/09*     (2006.01)
(Continued)

(52) U.S. Cl.
CPC ....... *G03G 9/08737* (2013.01); *B29C 67/0074* (2013.01); *B33Y 70/00* (2014.12); *G03G 9/0819* (2013.01); *G03G 9/08708* (2013.01); *G03G 9/08731* (2013.01); *G03G 9/08768* (2013.01); *G03G 9/08791* (2013.01); *G03G 9/0904* (2013.01); *G03G 9/09775* (2013.01); *G03G 13/08* (2013.01)

(58) Field of Classification Search
CPC .................. G03G 9/08791; G03G 9/09755
USPC ............................................ 430/108.22, 133
See application file for complete search history.

(56) References Cited

U.S. PATENT DOCUMENTS 2,297,691 A    10/1942    Carlson
4,988,602 A    1/1991     Jongewaard et al.
(Continued)

FOREIGN PATENT DOCUMENTS

CN    101310964    11/2008
EP    0712051      5/1996
(Continued)

OTHER PUBLICATIONS

"Xerography", Aug. 27, 2010, pp. 1-4, http:/en.wikipedia.org/wiki/Xerography.

(Continued)

*Primary Examiner* — Mark A Chapman
(74) *Attorney, Agent, or Firm* — Peter J. Ims; Westman, Champlin & Koehler, P.A.

(57) ABSTRACT

A part material for printing three-dimensional parts with an electrophotography-based additive manufacturing system, the part material including a composition having a copolymer (including acrylonitrile units, butadiene units, and aromatic units), a charge control agent, and a heat absorber. The part material is provided in a powder form having a controlled particle size, and is configured for use in the electrophotography-based additive manufacturing system having a layer transfusion assembly for printing the three-dimensional parts in a layer-by-layer manner.

20 Claims, 5 Drawing Sheets

(51) Int. Cl.
    *G03G 13/08* (2006.01)
    *B29C 67/00* (2006.01)
    *B33Y 70/00* (2015.01)

(56) References Cited

U.S. PATENT DOCUMENTS

| | | | |
|---|---|---|---|
| 5,088,047 A | 2/1992 | Bynum | |
| 5,099,288 A | 3/1992 | Britto et al. | |
| 5,254,421 A | 10/1993 | Coppens et al. | |
| 5,354,414 A | 10/1994 | Feygin | |
| 5,354,799 A | 10/1994 | Bennett et al. | |
| 5,514,232 A | 5/1996 | Burns | |
| 5,592,266 A | 1/1997 | Park et al. | |
| 5,593,531 A | 1/1997 | Penn | |
| 5,594,652 A | 1/1997 | Penn et al. | |
| 5,866,058 A | 2/1999 | Batchelder et al. | |
| 5,910,387 A | 6/1999 | Mychajlowskij et al. | |
| 5,981,616 A | 11/1999 | Yamamura et al. | |
| 5,990,268 A | 11/1999 | Dickens, Jr. et al. | |
| 6,052,551 A | 4/2000 | De Cock et al. | |
| 6,066,285 A | 5/2000 | Kumar | |
| 6,169,605 B1 | 1/2001 | Penn et al. | |
| 6,206,672 B1 | 3/2001 | Grenda | |
| 6,329,115 B1 | 12/2001 | Yamashita | |
| 6,376,148 B1 | 4/2002 | Liu et al. | |
| 6,509,128 B1 | 1/2003 | Everaerts et al. | |
| 6,531,086 B1 | 3/2003 | Larsson | |
| 6,780,368 B2 | 8/2004 | Liu et al. | |
| 6,799,959 B1 | 10/2004 | Tochimoto et al. | |
| 6,815,636 B2 | 11/2004 | Chung et al. | |
| 6,887,640 B2 | 5/2005 | Zhang et al. | |
| 7,011,783 B2 | 3/2006 | Fong | |
| 7,077,638 B2 | 7/2006 | Leyden et al. | |
| 7,208,257 B2 | 4/2007 | Cheng et al. | |
| 7,261,541 B2 | 8/2007 | Fong | |
| 7,261,542 B2 | 8/2007 | Hickerson et al. | |
| 7,291,242 B2 | 11/2007 | Khoshnevis | |
| 7,435,763 B2 | 10/2008 | Farr et al. | |
| 7,815,826 B2 | 10/2010 | Serdy et al. | |
| 7,988,906 B2 | 8/2011 | Monsheimer et al. | |
| 8,047,251 B2 | 11/2011 | Khoshnevis | |
| 8,119,053 B1 | 2/2012 | Bedal et al. | |
| 8,123,999 B2 | 2/2012 | Priedeman, Jr. et al. | |
| 8,124,192 B2 | 2/2012 | Paasche et al. | |
| 8,147,910 B2 | 4/2012 | Kritchman | |
| 8,173,258 B2 | 5/2012 | Monsheimer et al. | |
| 8,216,757 B2 | 7/2012 | Mizutani et al. | |
| 8,221,671 B2 | 7/2012 | Hull et al. | |
| 8,246,888 B2 | 8/2012 | Hopkins et al. | |
| 8,249,480 B2 | 8/2012 | Aslam et al. | |
| 8,459,280 B2 | 6/2013 | Swanson et al. | |
| 9,023,566 B2 * | 5/2015 | Martin | G03G 9/08791 430/108.22 |
| 2002/0093115 A1 | 7/2002 | Jang et al. | |
| 2002/0145213 A1 | 10/2002 | Liu et al. | |
| 2003/0087176 A1 | 5/2003 | Ezenyilimba et al. | |
| 2004/0232583 A1 | 11/2004 | Monsheimer et al. | |
| 2005/0207801 A1 | 9/2005 | Kunii et al. | |
| 2005/0218549 A1 | 10/2005 | Farr et al. | |
| 2008/0032083 A1 | 2/2008 | Serdy et al. | |
| 2008/0169585 A1 | 7/2008 | Zinniel | |
| 2008/0169589 A1 | 7/2008 | Sperry et al. | |
| 2008/0171284 A1 | 7/2008 | Hull et al. | |
| 2008/0226346 A1 | 9/2008 | Hull et al. | |
| 2009/0236775 A1 | 9/2009 | Monsheimer et al. | |
| 2011/0117485 A1 | 5/2011 | Hermann et al. | |
| 2011/0186081 A1 | 8/2011 | Dunn et al. | |
| 2012/0041132 A1 | 2/2012 | Monsheimer et al. | |
| 2012/0139167 A1 | 6/2012 | Fruth et al. | |
| 2012/0201960 A1 | 8/2012 | Hartmann et al. | |
| 2012/0202012 A1 | 8/2012 | Grebe et al. | |
| 2012/0237870 A1 | 9/2012 | Watanabe et al. | |
| 2012/0263488 A1 | 10/2012 | Aslam et al. | |
| 2012/0274002 A1 | 11/2012 | Uchida | |
| 2013/0075013 A1 | 3/2013 | Chillscyzn et al. | |
| 2013/0077996 A1 | 3/2013 | Hanson et al. | |
| 2013/0077997 A1 | 3/2013 | Hanson et al. | |
| 2013/0171434 A1 | 7/2013 | Hirth et al. | |

FOREIGN PATENT DOCUMENTS

| | | |
|---|---|---|
| EP | 0896253 A1 | 2/1999 |
| GB | 2446386 | 8/2008 |
| JP | 5165350 | 7/1993 |
| JP | 8281808 | 10/1996 |
| JP | 2001075376 | 3/2001 |
| JP | 2002347129 | 12/2002 |
| JP | 2003053849 | 2/2003 |
| JP | 2003071940 | 3/2003 |
| JP | 2005062860 | 3/2005 |
| JP | 2006182813 | 7/2006 |
| WO | 9851464 | 11/1998 |
| WO | 2007114895 | 10/2007 |
| WO | 2011065920 | 6/2011 |
| WO | 2012034666 A1 | 3/2012 |

OTHER PUBLICATIONS

Jones, Jason, "Selective Laser Printing", published prior to Jan. 14, 2013, 1 page.

International Search Report and Written Opinion dated Nov. 6, 2014 for corresponding International Patent Application No. PCT/US2014/046798, filed Jul. 16, 2014.

English Translation of Yamada et al. JP 10-207194, dated Aug. 7, 1998.

* cited by examiner

PART MATERIAL FOR ELECTROPHOTOGRAPHY-BASED ADDITIVE MANUFACTURING

CROSS-REFERENCE TO RELATED APPLICATIONS

This Application is a Continuation Application of U.S. patent application Ser. No. 13/944,472, filed Jul. 17, 2013; the contents of which are incorporated by reference.

BACKGROUND

The present disclosure relates to additive manufacturing systems for printing three-dimensional (3D) parts and support structures. In particular, the present disclosure relates to consumable materials for printing 3D parts and support structures using an imaging process, such as electrophotography.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to a part material for printing 3D parts with an electrophotography-based additive manufacturing system. The part material has a composition that includes a copolymer comprising acrylonitrile units, butadiene units, and aromatic units, a charge control agent, and a heat absorber. The part material is provided in a powder form having a controlled particle size (e.g., a D50 particle size ranging from about 5 micrometers to about 30 micrometers), and is configured for use in the electrophotography-based additive manufacturing system having a layer transfusion assembly for printing the 3D parts in a layer-by-layer manner.

Another aspect of the present disclosure is directed to a part material for printing 3D parts with an electrophotography-based additive manufacturing system, where the part material has a composition that includes an acrylonitrile-butadiene-styrene (ABS) copolymer, a charge control agent, a flow control agent, and a heat absorber. The part material is provided in a powder form having a controlled particle size and an narrow particle size distribution, and is configured for use in the electrophotography-based additive manufacturing system having a layer transfusion assembly for printing the three-dimensional parts in a layer-by-layer manner.

In some embodiments, the above-discussed part materials may be provided in interchangeable cartridges or other similar devices, along with carrier particles, for use with the electrophotography-based additive manufacturing systems.

Another aspect of the present disclosure is directed to a method for printing a 3D part with an electrophotography-based additive manufacturing system having an electrophotography engine, a transfer medium, and a layer transfusion assembly. The method includes providing a part material to the electrophotography-based additive manufacturing system, where the part material compositionally includes a charge control agent, a heat absorber, and a copolymer having acrylonitrile units, butadiene units, and aromatic units, and has a powder form.

The method also includes triboelectrically charging the part material to a desired triboelectric charge (e.g., a Q/M ratio having a negative charge or a positive charge, and a magnitude ranging from about 5 micro-Coulombs/gram to about 50 micro-Coulombs/gram), and developing layers of the 3D part from the charged part material with the electrophotography engine. The method further includes electrostatically attracting the developed layers from the electrophotography engine to the transfer medium, moving the attracted layers to the layer transfusion assembly with the transfer medium, and transfusing the moved layers to previously-printed layers of the 3D part with the layer transfusion assembly.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "an" ABS copolymer is interpreted to include one or more polymer molecules of the ABS copolymer, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one ABS copolymer", "one or more ABS copolymers", and "ABS copolymer(s)" may be used interchangeably and have the same meaning.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

The present disclosure is directed to consumable materials, such as part and support materials, which are engineered for use in an electrophotography-based additive manufacturing system to print 3D parts and support structures with high resolutions and fast printing rates. During a printing operation, electrophotography (EP) engines may develop or otherwise image each layer of the part and support materials using the electrophotographic process. The developed layers are then transferred to a layer transfusion assembly where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step. This allows numerous layers of 3D parts and support structures to be built vertically, beyond what is otherwise achievable via electrostatic transfers.

As discussed below, the part material is a powder-based, acrylonitrile-butadiene-styrene (ABS) part material that may be produced with a limited coalescence process. The ABS part material includes an ABS copolymer, a charge control agent (e.g., an internal triboelectric charge control agent), preferably a heat absorber (e.g., an infrared absorber), and optionally one or more additional materials, such as a flow control agent, which may also function as an external surface-treatment triboelectric charge control agent and/or a triboelectric modification additive. The ABS part material is engineered for use with electrophotography-based additive manufacturing systems to print 3D parts having high part resolutions and good physical properties (e.g., good part strength, density, chemical resistance, usable temperature ranges, and the like). This allows the resulting 3D parts to function as end-use parts, if desired.

FIGS. 1-4 illustrate system 10, which is an example electrophotography-based additive manufacturing system for printing 3D parts from the ABS part material of the present disclosure, and associated support structures from a sacrificial support material. As discussed further below, an example of a preferred support material for use with the ABS part material includes a soluble support material as disclosed in co-filed U.S. patent application Ser. No. 13/944,478, entitled "Soluble Support Material For Electrophotography-Based Additive Manufacturing".

Figure 1:
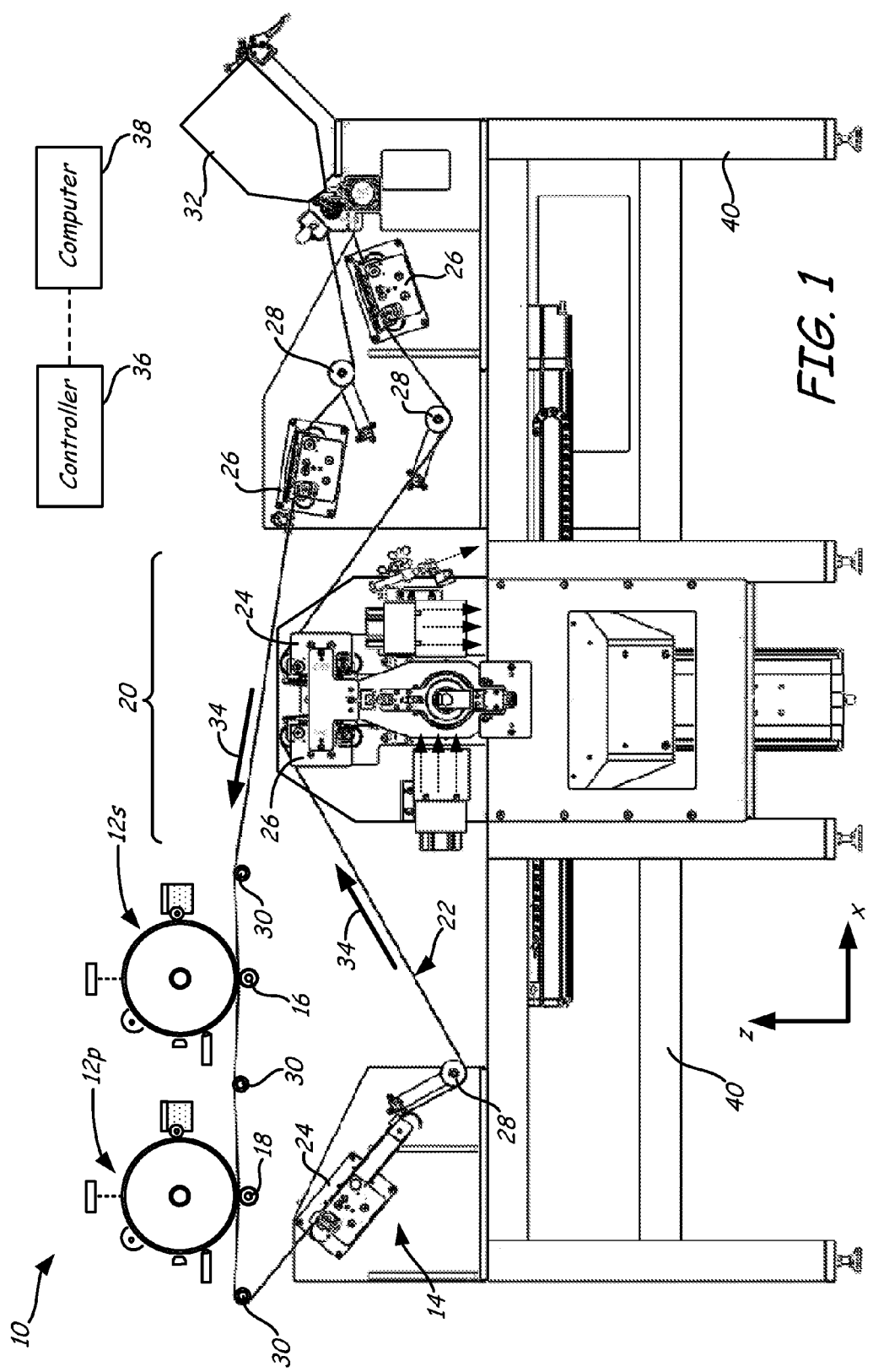
FIG. 1 is a front view of an example electrophotography-based additive manufacturing system for printing 3D parts and support structures from part and support materials of the present disclosure.

As shown in FIG. 1, system 10 includes a pair of EP engines 12p and 12s, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. patent application Ser. Nos. 13/790,382 and 13/790,406.

EP engines 12p and 12s are imaging engines for respectively imaging or otherwise developing layers of the part and support materials, where the part and support materials are each preferably engineered for use with the particular architecture of EP engine 12p or 12s. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

System 10 also includes controller 36, which is one or more control circuits, microprocessor-based engine control systems, and/or digitally-controlled raster imaging processor systems, and which is configured to operate the components of system 10 in a synchronized manner based on printing instructions received from host computer 38. Host computer 38 is one or more computer-based systems configured to communicate with controller 36 to provide the print instructions (and other operating information). For example, host computer 38 may transfer information to controller 36 that relates to the sliced layers of the 3D parts and support structures, thereby allowing system 10 to print the 3D parts and support structures in a layer-by-layer manner.

The components of system 10 may be retained by one or more frame structures, such as frame 40. Additionally, the components of system 10 are preferably retained within an enclosable housing (not shown) that prevents ambient light from being transmitted to the components of system 10 during operation.

Figure 2:
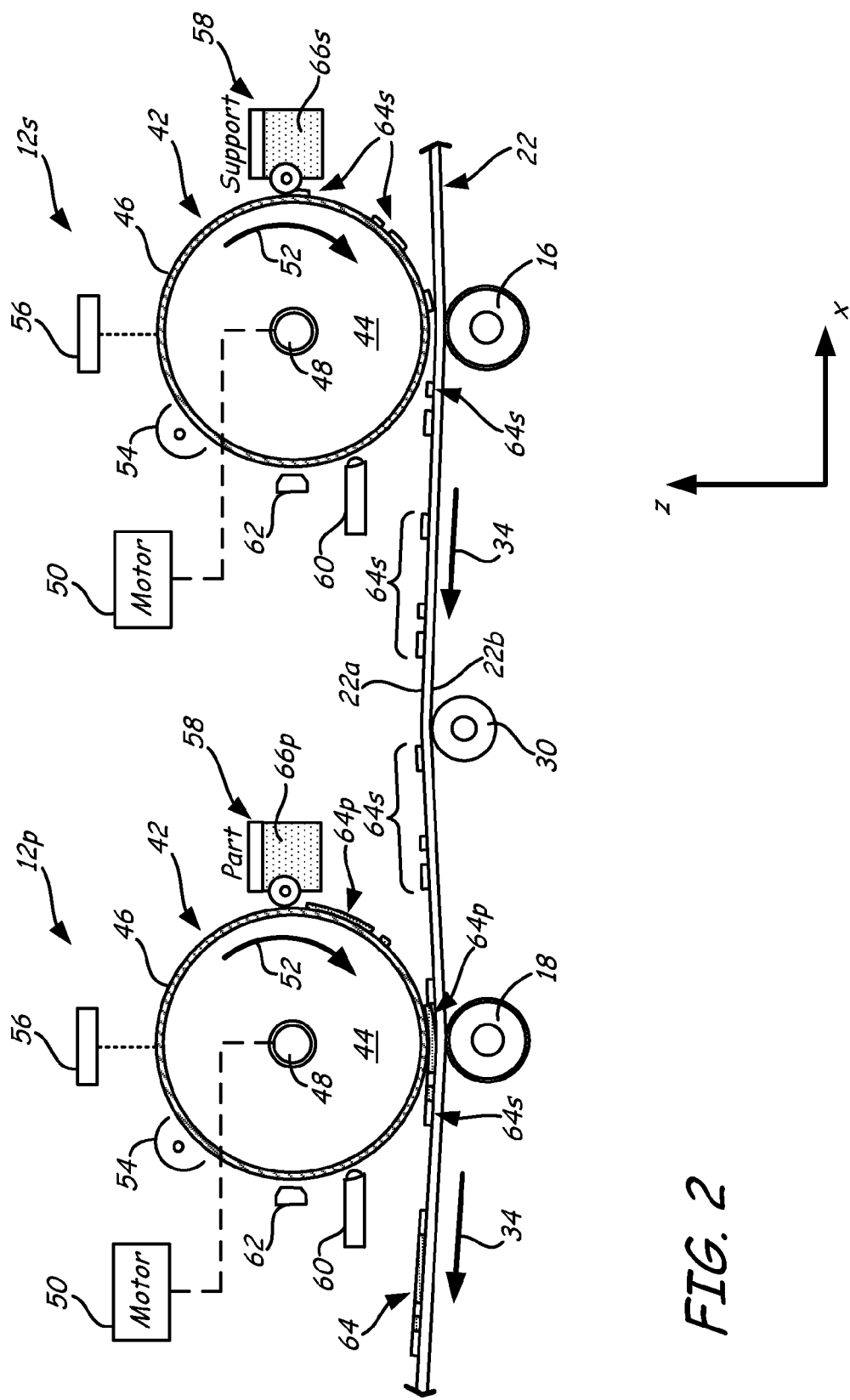
FIG. 2 is a schematic front view of a pair of electrophotography engines of the system for developing layers of the part and support materials.

FIG. 2 illustrates EP engines 12p and 12s, where EP engine 12s (i.e., the upstream EP engine relative to the rotational direction of belt 22) develops layers of the support material, and EP engine 12p (i.e., the downstream EP engine relative to the rotational direction of belt 22) develops layers of the part material. In alternative embodiments, the arrangement of EP engines 12p and 12s may be reversed such that EP engine 12p is upstream from EP engine 12s relative to the rotational direction of belt 22. In further alternative embodiments, system 10 may include three or more EP engines for printing layers of additional materials.

In the shown embodiment, EP engines 12p and 12s may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of a 3D part or support structure (or negative images), and to attract charged particles of the part or support material of the present disclosure to the charged or discharged image areas, thereby creating the layers of the 3D part or support structure.

As further shown, EP engines 12p and 12s also includes charge inducer 54, imager 56, development station 58, cleaning station 60, and discharge device 62, each of which may be in signal communication with controller 36. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12s is used to form layers 64s of the support material (referred to as support material 66s), where a supply of support material 66s may be retained by development station 58 (of EP engine 12s) along with carrier particles. Similarly, the image-forming assembly for surface 46 of EP engine 12p is used to form layers 64p of the part material (referred to as part material 66p), where a supply of part material 66p may be retained by development station 58 (of EP engine 12p) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 is directed by controller 36, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66p or support material 66s, preferably in powder form, along with carrier particles. Development stations 58 may function in a similar manner to single or dual component development systems and toner cartridges used in 2D electrophotography systems. For example, each development station 58 may include an enclosure for retaining the part material 66p or support material 66s and carrier particles. When agitated, the carrier particles generate triboelectric charges to attract the powders of the part material 66p or support material 66s, which charges the attracted powders to a desired sign and magnitude, as discussed below.

Each development station 58 may also include one or more devices for transferring the charged part material 66p or support material 66s to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66p or support material 66s is attracted to the appropriately charged regions of the latent image on surface 46, utilizing either charged area development or discharged area development (depending on the electrophotography mode being utilized). This creates successive layers 64p or 64s as photoconductor drum 12 continues to rotate in the direction of arrow 52, where the successive layers 64p or 64s correspond to the successive sliced layers of the digital representation of the 3D part or support structure.

The successive layers 64p or 64s are then rotated with surface 46 in the direction of arrow 52 to a transfer region in which layers 64p or 64s are successively transferred from photoconductor drum 42 to belt 22, as discussed below. While illustrated as a direct engagement between photoconductor drum 42 and belt 22, in some preferred embodiments, EP engines 12p and 12s may also include intermediary transfer drums and/or belts, as discussed further below.

After a given layer 64p or 64s is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64p or 64s passes cleaning station 60. Cleaning station 60 is a station configured to remove any residual, non-transferred portions of part or support material 66p or 66s. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64p and 64s from photoconductor drum 42 (or an intermediary transfer drum or belt) to layer transfusion assembly 16. Examples of suitable transfer belts for belt 22 include those disclosed in Comb et al., U.S. patent application Ser. Nos. 13/790,382 and 13/790,406. Belt 22 includes front surface 22a and rear surface 22b, where front surface 22a faces surface 46 of photoconductor drums 42 and rear surface 22b is in contact with biasing mechanisms 16 and 18.

Biasing mechanisms 16 and 18 are configured to induce electrical potentials through belt 22 to electrostatically attract layers 64p and 64s from EP engines 12p and 12s to belt 22. Because layers 64p and 64s are each only a single layer increment in thickness at this point in the process, electrostatic attraction is suitable for transferring layers 64p and 64s from EP engines 12p and 12s to belt 22.

Controller 36 preferably rotates photoconductor drums 36 of EP engines 12p and 12s at the same rotational rates that are synchronized with the line speed of belt 22 and/or with any intermediary transfer drums or belts. This allows system 10 to develop and transfer layers 64p and 66s in coordination with each other from separate developer images. In particular, as shown, each part layer 64p may be transferred to belt 22 with proper registration with each support layer 64s to preferably produce a combined part and support material layer 64. This allows layers 64p and 64s to be transfused together, requiring the part and support materials to have thermal properties and melt rheologies that are similar or substantially the same. As can be appreciated, some layers transferred to layer transfusion assembly 20 may only include support material 66s or may only include part material 66p, depending on the particular support structure and 3D part geometries and layer slicing.

In an alternative and less-preferred embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part and support structure.

Figure 3:
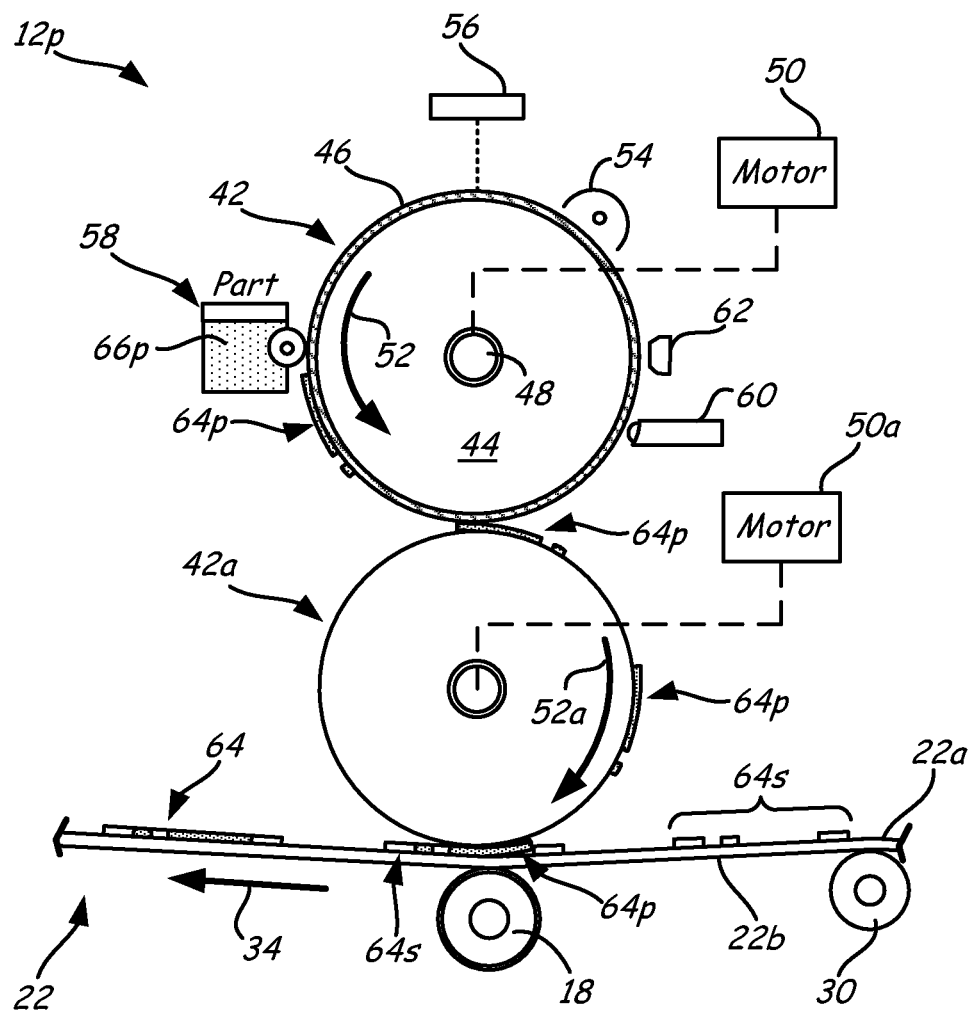
FIG. 3 is a schematic front view of an alternative electrophotography engine, which includes an intermediary drum or belt.

In some preferred embodiments, one or both of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a. Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired.

Figure 4:
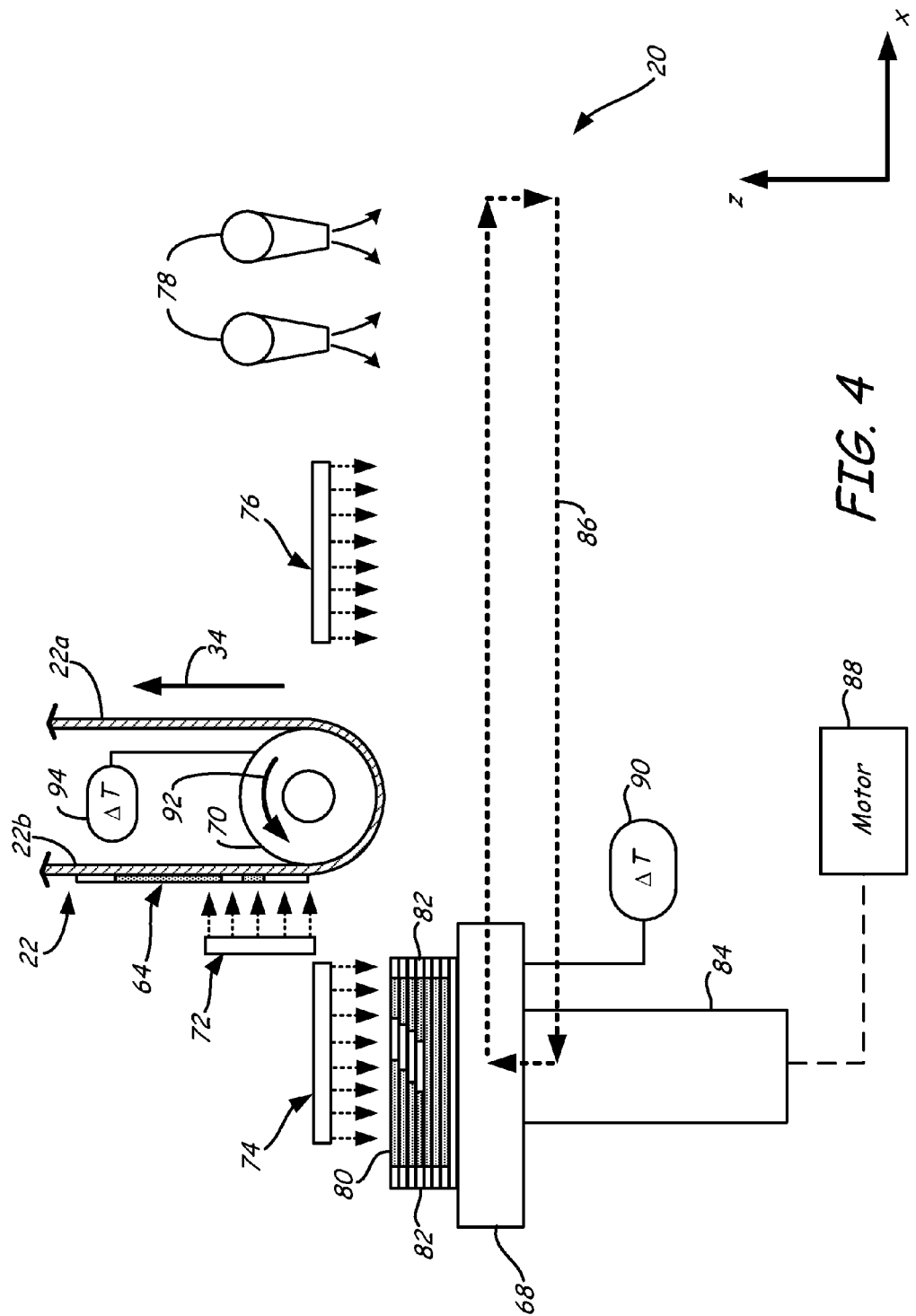
FIG. 4 is a schematic front view of a layer transfusion assembly of the system for performing layer transfusion steps with the developed layers.

FIG. 4 illustrates an example embodiment for layer transfusion assembly 20. As shown, layer transfusion assembly 20 includes build platform 68, nip roller 70, heaters 72 and 74, post-fuse heater 76, and air jets 78 (or other cooling units). Build platform 68 is a platform assembly or platen of system 10 that is configured to receive the heated combined layers 64 (or separate layers 64p and 64s) for printing a 3D part and support structure, referred to as 3D part 80 and support structure 82, in a layer-by-layer manner. In some embodiments, build platform 68 may include removable film substrates (not shown) for receiving the printed layers 64, where the removable film substrates may be restrained against build platform using any suitable technique (e.g., vacuum drawing, removable adhesive, mechanical fastener, and the like).

Build platform 68 is supported by gantry 84, which is a gantry mechanism configured to move build platform 68 along the z-axis and the x-axis to produce a reciprocating rectangular pattern, where the primary motion is back-and-forth along the x-axis (illustrated by broken lines 86. Gantry 84 may be operated by motor 88 based on commands from controller 36, where motor 88 may be an electrical motor, a hydraulic system, a pneumatic system, or the like.

In the shown embodiment, build platform 68 is heatable with heating element 90 (e.g., an electric heater). Heating element 90 is configured to heat and maintain build platform 68 at an elevated temperature that is greater than room temperature (25° C.), such as at a desired average part temperature of 3D part 80 and/or support structure 82, as discussed in Comb et al., U.S. patent application Ser. Nos. 13/790,382 and 13/790,406. This allows build platform 68 to assist in maintaining 3D part 80 and/or support structure 82 at this average part temperature.

Nip roller 70 is an example heatable element or heatable layer transfusion element, which is configured to rotate around a fixed axis with the movement of belt 22. In particular, nip roller 70 may roll against rear surface 22b in the direction of arrow 92 while belt 22 rotates in the direction of arrow 34. In the shown embodiment, nip roller 70 is heatable with heating element 94 (e.g., an electric heater). Heating element 94 is configured to heat and maintain nip roller 70 at an elevated temperature that is greater than room temperature (25° C.), such as at a desired transfer temperature for layers 64.

Heater 72 is one or more heating devices (e.g., an infrared heater and/or a heated air jet) configured to heat layers 64 to a temperature near an intended transfer temperature of the part and support materials, such as at least a fusion temperature of the part and support materials, preferably prior to reaching nip roller 70. Each layer 64 desirably passes by (or through) heater 72 for a sufficient residence time to heat the layer 64 to the intended transfer temperature. Heater 74 may function in the same manner as heater 72, and heats the top surfaces of 3D part 80 and support structure 82 to an elevated temperature, such as at the same transfer temperature as the heated layers 64 (or other suitable elevated temperature).

As mentioned above, the support material 66s used to print support structure 82 preferably has thermal properties (e.g., glass transition temperature) and a melt rheology that are similar to or substantially the same as the thermal properties and the melt rheology of the part material 66p used to print 3D part 80. This allows part and support materials of layers 64p and 64s to be heated together with heater 74 to substantially the same transfer temperature, and also allows the part and support materials at the top surfaces of 3D part 80 and support structure 82 to be heated together with heater 74 to substantially the same temperature. Thus, the part layers 64p and the support layers 64s may be transfused together to the top surfaces of 3D part 80 and support structure 82 in a single transfusion step as combined layer 64. This single transfusion step for transfusing the combined layer 64 is not believed to be feasible without matching the thermal properties and the melt rheologies of the part and support materials.

Post-fuse heater 76 is located downstream from nip roller 70 and upstream from air jets 78, and is configured to heat the transfused layers to an elevated temperature in the post-fuse or heat-setting step. Again, the similar thermal properties and melt rheologies of the part and support materials allow post-fuse heater 76 to post-heat the top surfaces of 3D part 80 and support structure 82 together in a single post-fuse step.

Prior to printing 3D part 80 and support structure 82, build platform 68 and nip roller 70 may be heated to their desired temperatures. For example, build platform 68 may be heated to the average part temperature of 3D part 80 and support structure 82 (due to the close melt rheologies of the part and support materials). In comparison, nip roller 70 may be heated to a desired transfer temperature for layers 64 (also due to the similar thermal properties and melt rheologies of the part and support materials).

During the printing operation, belt 22 carries a layer 64 past heater 72, which may heat the layer 64 and the associated region of belt 22 to the transfer temperature. Suitable transfer temperatures for the part and support materials include temperatures that exceed the glass transition temperatures of the part and support materials, which are preferably similar or substantially the same, and where the part and support materials of layer 64 are softened but not melted (e.g., a temperature of ranging from about 140° C. to about 180° C. for the ABS part material).

As further shown in FIG. 4, during operation, gantry 84 may move build platform 68 (with 3D part 80 and support structure 82) in a reciprocating rectangular pattern 86. In particular, gantry 84 may move build platform 68 along the x-axis below, along, or through heater 74. Heater 74 heats the top surfaces of 3D part 80 and support structure 82 to an elevated temperature, such as the transfer temperatures of the part and support materials. As discussed in Comb et al., U.S. patent application Ser. Nos. 13/790,382 and 13/790,406, heaters 72 and 74 may heat layers 64 and the top surfaces of 3D part 80 and support structure 82 to about the same temperatures to provide a consistent transfusion interface temperature. Alternatively, heaters 72 and 74 may heat layers 64 and the top surfaces of 3D part 80 and support structure 82 to different temperatures to attain a desired transfusion interface temperature.

The continued rotation of belt 22 and the movement of build platform 68 align the heated layer 64 with the heated top surfaces of 3D part 80 and support structure 82 with proper registration along the x-axis. Gantry 84 may continue to move build platform 68 along the x-axis, at a rate that is synchronized with the rotational rate of belt 22 in the direction of arrow 34 (i.e., the same directions and speed). This causes rear surface 22b of belt 22 to rotate around nip roller 70 to nip belt 22 and the heated layer 64 against the top surfaces of 3D part 80 and support structure 82. This presses the heated layer 64 between the heated top surfaces of 3D part 80 and support structure 82 at the location of nip roller 70, which at least partially transfuses heated layer 64 to the top layers of 3D part 80 and support structure 82.

As the transfused layer 64 passes the nip of nip roller 70, belt 22 wraps around nip roller 70 to separate and disengage from build platform 68. This assists in releasing the transfused layer 64 from belt 22, allowing the transfused layer 64 to remain adhered to 3D part 80 and support structure 82. Maintaining the transfusion interface temperature at a transfer temperature that is higher than the glass transition temperatures of the part and support materials, but lower than their fusion temperatures, allows the heated layer 64 to be hot enough to adhere to 3D part 80 and support structure 82, while also being cool enough to readily release from belt 22. Additionally, as discussed above, the similar thermal properties and melt rheologies of the part and support materials allow them to be transfused in the same step.

After release, gantry 84 continues to move build platform 68 along the x-axis to post-fuse heater 76. At post-fuse heater 76, the top-most layers of 3D part 80 and support structure 82 (including the transfused layer 64) may then be heated to at least the fusion temperature of the part and support materials in a post-fuse or heat-setting step. This melts the part and support materials of the transfused layer 64 to a highly fusable state such that polymer molecules of the transfused layer 64 quickly interdiffuse to achieve a high level of interfacial entanglement with 3D part 80 and support structure 82.

Additionally, as gantry 84 continues to move build platform 68 along the x-axis past post-fuse heater 76 to air jets 78, air jets 78 blow cooling air towards the top layers of 3D part 80 and support structure 82. This actively cools the transfused layer 64 down to the average part temperature, as discussed in Comb et al., U.S. patent application Ser. Nos. 13/790,382 and 13/790,406.

To assist in keeping 3D part 80 and support structure 82 at the average part temperature, in some preferred embodiments, heater 74 and/or post-heater 76 may operate to heat only the top-most layers of 3D part 80 and support structure 82. For example, in embodiments in which heaters 72, 74, and 76 are configured to emit infrared radiation, 3D part 80 and support structure 82 may include heat absorbers and/or other colorants configured to restrict penetration of the infrared wavelengths to within the top-most layers. Alternatively, heaters 72, 74, and 76 may be configured to blow heated air across the top surfaces of 3D part 80 and support structure 82. In either case, limiting the thermal penetration into 3D part 80 and support structure 82 allows the top-most layers to be sufficiently transfused, while also reducing the amount of cooling required to keep 3D part 80 and support structure 82 at the average part temperature.

Gantry 84 may then actuate build platform 68 downward, and move build platform 68 back along the x-axis to a starting position along the x-axis, following the reciprocating rectangular pattern 86. Build platform 68 desirably reaches the starting position for proper registration with the next layer 64. In some embodiments, gantry 84 may also actuate build platform 68 and 3D part 80/support structure 82 upward for proper registration with the next layer 64. The same process may then be repeated for each remaining layer 64 of 3D part 80 and support structure 82.

In some preferred embodiments, a resulting 3D part 80 is encased laterally (i.e., horizontally to the build plane) in the support structure 82, such as shown in FIG. 4. This is believed to provide good dimensional integrity and surface quality for the 3D part 80 while using a reciprocating build platen 68 and a nip roller 70.

After the printing operation is completed, the resulting 3D part 80 and support structure 82 may be removed from system 10 and undergo one or more post-printing operations. For example, support structure 82 derived from the support material of the present disclosure may be sacrificially removed from 3D part 80, such as by using an aqueous-based solution (e.g., an aqueous alkali solution). For instance, an example of a preferred support material for use with the ABS part material includes a soluble support material as disclosed in co-filed U.S. patent application Ser. No. 13/944,478, entitled "Soluble Support Material For Electrophotography-Based Additive Manufacturing" (attorney docket no. S697.12-0261). Under this preferred soluble technique, support structure 82 may at least partially dissolve in the solution, separating it from 3D part 80 in a hands-free manner.

In comparison, part materials such as the ABS part material are chemically resistant to aqueous alkali solutions. This allows the use of an aqueous alkali solution to be employed for removing the sacrificial support structure 82 without degrading the shape or quality of 3D part 80. Examples of suitable systems and techniques for removing support structure 82 in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Furthermore, after support structure 82 is removed, 3D part 80 may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

As briefly discussed above, the part material of the present disclosure, referred to herein as the "ABS part material", compositionally includes an acrylonitrile-butadiene-styrene (ABS) copolymer, a charge control agent, preferably a heat absorber (e.g., an infrared absorber), and optionally one or more additional materials, such as a flow control agent. As mentioned above, the ABS part material is preferably engineered for use with the particular architecture of EP engine 12p.

The ABS copolymer is polymerized from monomers that preferably include acrylonitrile, butadiene, and an aromatic monomer such as styrene. Example acrylonitrile monomers have the following structure:

$$N{\equiv}C{-}CH{=}CH_2 \quad \text{(Formula 1)}$$

where, in some embodiments, the hydrogen atoms in Formula 1 may be independently substituted with one or more optional low-atomic weight groups, such as an alkyl or ether group having 1-3 carbon atoms. Furthermore, in some embodiments, the ethylenically-unsaturated group and the cyano group may be separated by an optional chain linkage, such as a hydrocarbon or ether linkage having 1-8 carbon atoms. More preferably, the acrylonitrile monomer includes the structure shown above in Formula 1, with the ethylenically-unsaturated vinyl group extending directly from the cyano group.

Example butadiene monomers have the following structure:

$$H_2C{=}CH{-}CH{=}CH_2 \quad \text{(Formula 2)}$$

where, in some embodiments, the hydrogen atoms in Formula 2 may be independently substituted with one or more optional low-atomic weight groups, such as an alkyl or ether group having 1-3 carbon atoms. Furthermore, in some embodiments, the pair of ethylenically-unsaturated groups may be separated by an optional chain linkage, such as a hydrocarbon or ether linkage having 1-8 carbon atoms. More preferably, the butadiene monomer includes the structure shown above in Formula 2, with the pair of ethylenically-unsaturated vinyl groups extending directly from each other.

Example aromatic monomers have the following structure:

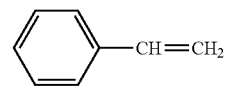
(Formula 3)

where, in some embodiments, the hydrogen atoms in Formula 3 may be independently substituted with one or more optional low-atomic weight groups, such as an alkyl or ether group having 1-3 carbon atoms. Furthermore, in some embodiments, the ethylenically-unsaturated group and the aromatic group may be separated by an optional chain linkage, such as a hydrocarbon or ether linkage having 1-8 carbon atoms. In some further embodiments, one or more hydrogen atoms of the aromatic group may be independently substituted with one or more optional low-atomic weight groups, such as an alkyl or ether group having 1-3 carbon atoms. More preferably, the aromatic monomer includes the structure shown above in Formula 3, with the ethylenically-unsaturated vinyl group extending directly from the aromatic group (i.e., styrene).

The monomers may be polymerized with a free-radical polymerization reaction using any suitable free-radical initiator. For example, at least a portion of the butadiene monomers may be initially polymerized to produce polybutadiene. Then the acrylonitrile and aromatic monomers may then be polymerized in the presence of the polybutadiene to produce long polybutadiene chains that are linked with shorter chains from the acrylonitrile and aromatic monomers (e.g., poly(styrene-acrylonitrile) chains). The nitrile groups of neighboring chains are believed to attract and bind the chains together, providing good strengths for the resulting ABS copolymer. The ABS copolymer may exist as an amorphous two-phase system having a continuous phase of the polymerized acrylonitrile and the aromatic monomers, and a dispersed phase of the polybutadiene that is dispersed or otherwise distributed in the continuous phase.

The acrylonitrile monomers used to produce the ABS copolymer may constitute from about 10% to about 45% by weight, and more preferably from about 15% to about 35% by weight, based on an entire weight of monomers used to produce the ABS copolymer. The butadiene monomers may constitute from about 1% to about 50% by weight, and more preferably from about 5% to about 35% by weight, based on the entire weight of the monomers used to produce the ABS copolymer. Similarly, the aromatic monomers (e.g., styrene) may constitute from about 30% to about 75% by weight, and more preferably from about 40% to about 60% by weight, based on the entire weight of the monomers used to produce the ABS copolymer.

In some embodiments, the monomers used to polymerize the ABS copolymer may include one or more additional monomer compounds that preferably do not significantly detract from the strength, chemical, or thermal properties of the ABS copolymer. For example, the ABS copolymer may include monomers that function as chain extending units (e.g., ethylene units) for the polybutadiene backbone and/or the poly(styrene-acrylonitrile) chains.

Accordingly, the additional monomers may collectively constitute from 0% by weight to about 10% by weight, based on the entire weight of the monomers used to produce the ABS copolymer. In some embodiment, the additional monomers may from about 0.1% to about 5% by weight, based on the entire weight of the monomers used to produce the ABS copolymer. The remainder of the monomers used to polymerize the ABS copolymer accordingly consist of the above-discussed acrylonitrile monomers, the butadiene monomers, and the aromatic monomers (e.g., styrene)

In other preferred embodiments, the monomers used to polymerize the ABS copolymer consist essentially or completely of the acrylonitrile monomers, the butadiene monomers, and the aromatic monomers (e.g., styrene). In more preferred embodiments, the monomers used to polymerize the ABS copolymer consist essentially or completely of the monomers having structures as shown above in Formulas 1-3.

Additionally, in some embodiments, modifications can be made when producing the ABS copolymer in order to modify the impact resistance, toughness, and/or heat resistance. For example, impact resistance can be increased by increasing the proportion of the butadiene monomers relative to the acrylonitrile and aromatic monomers.

The ABS copolymer preferably has a molecular weight that provides suitable melt rheologies for use in an EP-based additive manufacturing system (e.g., system 10) to print 3D parts (e.g., 3D part 80), which may be characterized by the glass transition temperature, melt flow rate, and/or dynamic viscosity of the ABS copolymer. Examples of preferred glass transition temperatures for the ABS copolymer range from about 100° C. to about 115° C., more preferably from about 105° C. to about 110° C.

Suitable dynamic viscosities for the ABS copolymer at 180° C. range from about 17 kilopascal-seconds to about 24 kilopascal-seconds, at 190° C. range from about 6 kilopascal-seconds to about 10 kilopascal-seconds, and at 200° C. range from about 3.5 kilopascal-seconds to about 4.5 kilopascal-seconds. The dynamic viscosities referred to herein are determined pursuant to the Melt Rheology test described below.

As mentioned above, the ABS part material is engineered for use in an EP-based additive manufacturing system (e.g., system 10) to print 3D parts (e.g., 3D part 80). As such, the ABS part material may also include one or more materials to assist in developing layers with EP engine 12p, to assist in transferring the developed layers from EP engine 12p to layer transfusion assembly 20, and to assist in transfusing the developed layers with layer transfusion assembly 20.

For example, in the electrophotographic process with system 10, the ABS part material is preferably charged triboelectrically through the mechanism of frictional contact charging with carrier particles at development station 58. This charging of the ABS part material may be referred to by its triboelectric charge-to-mass (Q/M) ratio, which may be a positive or negative charge and has a desired magnitude. The Q/M ratio is inversely proportional to the powder density of the ABS part material, which can be referred to by its mass per unit area (M/A) value. For a given applied development field, as the value of Q/M ratio of the ABS part material is increased from a given value, the M/A value of the ABS part material decreases, and vice versa. Thus, the powder density for each developed layer of the part material is a function of the Q/M ratio of the ABS part material.

It has been found that, in order to provide successful and reliable development of the ABS part material onto development drum 44 and transfer to layer transfusion assembly 20 (e.g., via belt 22), and to print 3D part 80 with a good material density, the ABS part material preferably has a suitable Q/M ratio for the particular architecture of EP engine 12p and belt 22. Examples of preferred Q/M ratios for the ABS part material range from about −5 microCoulombs/gram (μC/g) to about −50 μC/g, more preferably from about −10 μC/g to about −40 μC/g, and even more preferably from about −15 μC/g to about −35 μC/g, and even more preferably from about −25 μC/g to about −30 μC/g.

In this embodiment, the Q/M ratio is based on a negative triboelectric charge. However, in an alternative embodiment, system 10 may operate such that the Q/M ratio of the ABS part material has a positive triboelectric charge with the above-discussed magnitudes. In either embodiment, these magnitudes of Q/M ratio prevent the electrostatic forces constraining the ABS part material to the carrier surfaces from being too excessive, and that any level of "wrong sign" powder is minimized. This reduces inefficiencies in the development of the ABS part material at EP engine 12p, and facilitates the development and transfer of each layer 64p with the desired M/A value.

Furthermore, if a consistent material density of 3D part 80 is desired, the desired Q/M ratio (and corresponding M/A value) is preferably maintained at a stable level during an entire printing operation with system 10. However, over extended printing operations with system 10, development station 58 of EP engine 12p may need to be replenished with additional amounts of the ABS part material. This can present an issue because, when introducing additional amounts of the ABS part material to development station 58 for replenishment purposes, the ABS part material is initially in an uncharged state until mixing with the carrier particles. As such, the ABS part material also preferably charges to the desired Q/M ratio at a rapid rate to maintain a continuous printing operation with system 10.

Accordingly, controlling and maintaining the Q/M ratio during initiation of the printing operation, and throughout the duration of the printing operation, will control the resultant rate and consistency of the M/A value of the ABS part material. In order to reproducibly and stably achieve the desired Q/M ratio, and hence the desired M/A value, over extended printing operations, the ABS part material preferably includes one or more charge control agents, which may be added to the ABS copolymer during the manufacturing process of the ABS part material.

In embodiments in which the Q/M ratio of the ABS part material has a negative charge, suitable charge control agents for use in the ABS part material include acid metal complexes (e.g., oxy carboxylic acid complexes of chromium, zinc, and aluminum), azo metal complexes (e.g., chromium azo complexes and iron azo complexes), mixtures thereof, and the like.

Alternatively, in embodiments in which the Q/M ratio of the ABS part material has a positive charge, suitable charge control agents for use in the ABS part material include azine-based compounds, and quaternary ammonium salts, mixtures thereof, and the like. These agents are effective at positively charging the ABS copolymer when frictionally contact charged against appropriate carrier particles.

The charge control agents preferably constitute from about 0.1% by weight to about 5% by weight of the ABS part material, more preferably from about 0.5% by weight to about 2% by weight, and even more preferably from about 0.75% by weight to about 1.5% by weight, based on the entire weight of the ABS part material. As discussed above, these charge control agents preferably increase the charging rate of the ABS copolymer against the carrier, and stabilize the Q/M ratio over extended continuous periods of printing operations with system 10.

In many situations, system 10 prints layers 64$p$ with a substantially consistent material density over the duration of the printing operations. Having an ABS part material with a controlled and consistent Q/M ratio allows this to be achieved. However, in some situations, it may be desirable to adjust the material density between the various layers 64$p$ in the same printing operation. For example, system 10 may be operated to run in a grayscale manner with reduced material density, if desired, for one or more portions of 3D part 80.

In addition to incorporating the charge control agents, for efficient operation EP engine 12$p$, and to ensure fast and efficient triboelectric charging during replenishment of the ABS part material, the mixture of the ABS part material preferably exhibits good powder flow properties. This is preferred because the ABS part material is fed into a development sump (e.g., a hopper) of development station 58 by auger, gravity, or other similar mechanism, where the ABS part material undergoes mixing and frictional contact charging with the carrier particles.

As can be appreciated, blockage or flow restrictions of the ABS part material during the replenishment feeding can inhibit the supply of the ABS part material to the carrier particles. Similarly, portions of the ABS part material should not become stuck in hidden cavities in development station 58. Each of these situations can alter the ratio of the ABS part material to the carrier particles, which, as discussed above, is preferably maintained at a constant level to provide the desired Q/M ratio for the charged ABS part material.

For example, the ABS part material may constitute from about 1% by weight to about 30% by weight, based on a combined weight of the ABS part material and the carrier particles, more preferably from about 5% to about 20%, and even more preferably from about 5% to about 10%. The carrier particles accordingly constitute the remainder of the combined weight.

The powder flow properties of the ABS part material can be improved or otherwise modified with the use of one or more flow control agents, such as inorganic oxides. Examples of suitable inorganic oxides include hydrophobic fumed inorganic oxides, such as fumed silica, fumed titania, fumed alumina, mixtures thereof, and the like, where the fumed oxides may be rendered hydrophobic by silane and/or siloxane-treatment processes. Examples of commercially available inorganic oxides for use in the ABS part material include those under the tradename "AEROSIL" from Evonik Industries AG, Essen, Germany.

The flow control agents (e.g., inorganic oxides) preferably constitute from about 0.1% by weight to about 10% by weight of the ABS part material, more preferably from about 0.2% by weight to about 5% by weight, and even more preferably from about 0.3% by weight to about 1.5% by weight, based on the entire weight of the ABS part material.

As discussed above, the one or more charge control agents are suitable for charging the ABS copolymer to a desired Q/M ratio for developing layers of the ABS part material at EP engine 12$p$, and for transferring the developed layers (e.g., layers 64) to layer transfusion assembly 20 (e.g., via belt 22). However, the multiple printed layers in a 3D environment effectively prevents the electrostatic transfer of ABS part material after a given number of layers are printed. Instead, layer transfusion assembly 20 utilizes heat and pressure to transfuse the developed layers together in the transfusion steps.

In particular, heaters 72 and/or 74 may heat layers 64 and the top surfaces of 3D part 80 and support structure 82 to a temperature near an intended transfer temperature of the ABS part material, such as at least a fusion temperature of the ABS part material, prior to reaching nip roller 70. Similarly, post-fuse heater 76 is located downstream from nip roller 70 and upstream from air jets 78, and is configured to heat the transfused layers to an elevated temperature in the post-fuse or heat-setting step.

Accordingly, the ABS part material may also include one or more heat absorbers configured to increase the rate at which the ABS part material is heated when exposed to heater 72, heater 74, and/or post-heater 76. For example, in embodiments in which heaters 72, 74, and 76 are infrared heaters, the heat absorber(s) used in the ABS part material may be one or more infrared (including near-infrared) wavelength absorbing materials. As discussed below, these heat absorbers may be incorporated into the particles of the ABS copolymer during the manufacturing of the ABS part material. Absorption of infrared light causes radiationless decay of energy to occur within the particles, which generates heat in the ABS part material.

The heat absorber is preferably soluble or dispersible in the solvated ABS copolymers used for the preparation of the ABS part material with a limited coalescence process, as discussed below. Additionally, the heat absorber also preferably does not interfere with the formation of the ABS copolymer particles, or stabilization of these particles during the manufacturing process. Furthermore, the heat absorber preferably does not interfere with the control of the particle size and particle size distribution of the ABS copolymer particles, or the yield of the ABS copolymer particles during the manufacturing process.

Suitable infrared absorbing materials for use in the ABS part material may vary depending on the desired color of the ABS part material. Examples of suitable infrared absorbing materials include carbon black (which may also function as a black pigment for the ABS part material), as well as various classes of infrared absorbing pigments and dyes, such as those that exhibit absorption in the wavelengths ranging from about 650 nanometers (nm) to about 900 nm, those that exhibit absorption in the wavelengths ranging from about 700 nm to about 1,050 nm, and those that exhibit absorption in the wavelengths ranging from about 800 nm to about 1,200 nm. Examples of these pigments and dyes classes include anthraquinone dyes, polycyanine dyes metal dithiolene dyes and pigments, tris aminium dyes, tetrakis aminium dyes, mixtures thereof, and the like.

The infrared absorbing materials also preferably do not significantly reinforce or otherwise alter the melt rheologies of the ABS copolymer, such as the zero shear viscosity versus temperature profile of the ABS copolymer. For example, this can be achieved using a non-reinforcing type of carbon black, or a "low structure" type of carbon black, at low concentrations relative to the ABS copolymer. Accordingly, suitable dynamic viscosities for the ABS part material include those discussed above for the ABS copolymer at 180° C., 190° C., and 200° C.

Accordingly, in embodiments that incorporate heat absorbers, the heat absorbers (e.g., infrared absorbers) preferably constitute from about 0.5% by weight to about 10% by weight of the ABS part material, more preferably from about 1% by weight to about 5% by weight, and in some more preferred embodiments, from about 2% by weight to about 3% by weight, based on the entire weight of the ABS part material.

The ABS part material may also include one or more additional additives that are preferably soluble or dispersible in the solvated ABS copolymers used for the preparation of the ABS part material with a limited coalescence process, that preferably do not interfere with the formation of the ABS copolymer particles, or stabilization of these particles during the manufacturing process, and that preferably do not interfere with the control of the particle size and particle size distribution of the ABS copolymer particles, or the yield of the ABS copolymer particles during the manufacturing process.

Examples of suitable additional additives include colorants (e.g., pigments and dyes in addition to, or alternatively to, the heat absorbers), polymer stabilizers (e.g., antioxidants, light stabilizers, ultraviolet absorbers, and antiozonants), biodegradable additives, and combinations thereof. In embodiments that incorporate additional additives, the additional additives may collectively constitute from about 0.1% by weight to about 20% by weight of the ABS part material, more preferably from about 0.2% by weight to about 10% by weight, and even more preferably from about 0.5% by weight to about 5% by weight, based on the entire weight of the ABS part material.

For use in electrophotography-based additive manufacturing systems (e.g., system 10), the ABS part material preferably has a controlled average particle size and a narrow particle size distribution, as described below in the Particle Sizes and Particle Size Distributions standard. For example, preferred D50 particles sizes include those up to about 100 micrometers if desired, more preferably from about 10 micrometers to about 30 micrometers, more preferably from about 10 micrometers to about 20 micrometers, and even more preferably from about 10 micrometers to about 15 micrometers.

Additionally, the particle size distributions, as specified by the parameters D90/D50 particle size distributions and D50/D10 particle size distributions, each preferably range from about 1.00 to 1.40, more preferably from about 1.10 and to about 1.35, and even more preferably from about 1.15 to about 1.25. Moreover, the particle size distribution is preferably set such that the geometric standard deviation $\sigma_g$ preferably meets the criteria pursuant to the following Equation 1:

$$\sigma_g \sim \frac{D90}{D50} \sim \frac{D50}{D10}$$

In other words, the D90/D50 particle size distributions and D50/D10 particle size distributions are preferably the same value or close to the same value, such as within about 10% of each other, and more preferably within about 5% of each other.

The ABS part material is preferably manufactured by polymerizing or otherwise providing the ABS copolymer, and then formulating the ABS part material from the ABS copolymer (and other components) with the above-discussed particle sizes and particle size distributions. The ABS copolymer exhibits good impact resistance and toughness. Unfortunately, these desirable engineering properties make it difficult to mechanically grind the copolymer down to a size useful for the electrophotographic development process in EP engine 12p, particularly for the above-discussed particle sizes and particle size distributions. In fact, traditional grinding and pulverization methods are typically only capable of obtaining particle sizes around 30-60 micrometers, and in a low yield and production cost-inefficient manner.

Various other manufacturing processes have been examined to solve this problem, such as cryogenic grinding and milling where the ABS copolymer is embrittled using liquid nitrogen, dry ice (solid carbon dioxide) followed by mechanical pulverization, and pregrinding of pellets followed by air jet milling. Using these technologies may also prove cost-ineffective if grinding rates are particularly slow.

Instead, the ABS part material is preferably formulated from the ABS copolymer with a limited coalescence process, such as the process disclosed in Bennett et al., U.S. Pat. No. 5,354,799. For example, the constituents of the ABS part material (e.g., the ABS copolymer and charge control agent, heat absorber, and/or additional additives) may be dissolved or otherwise suspended in an organic solvent to a suitable concentration range such as from about 10% to about 20% by weight of the ABS copolymer in the organic solvent. Examples of suitable organic solvents include ethyl acetate, propyl acetate, butyl acetate, dichloromethane, methyl ethyl ketone, cyclohexane, toluene, mixtures thereof, and the like.

Separately, a buffered acidic aqueous solution may be prepared containing a dispersant such as colloidal silica, and preferably a water-droplet interface promoter, such as poly (adipic acid-co-methylaminoethanol). The organic solvent solution may then be slowly (e.g., incrementally) added to the buffered acidic aqueous solution while subjecting the whole mixture to high shear mixing, such as with a homogenizer. This creates droplets of the organic phase of controlled size and size distribution, which are stabilized by the colloidal silica in the aqueous phase. This mixing preferably continues until droplet growth and creation is completed.

The stabilized solvated droplet suspension may then be passed to a flash evaporator, where the organic solvent may be removed to a condensate tank using applied vacuum. The solid particles of the resulting ABS part material, which remain dispersed in the aqueous phase, may then be transferred to a stirred holding vessel, and the colloidal silica may be removed, such as with the use of an aqueous sodium hydroxide solution, filtration, and water.

The ABS part material may then be dried to produce its powder form. If necessary, following particle size analysis, the dry powder of the ABS part material may be subjected to further sieving to remove oversize particles, and/or classification to remove any level of fines that are considered detrimental to subsequent performance in system 10. This process typically produces the ABS part material in a yield ranging from about 90% by weight to about 99% by weight, based on the original amount of the ABS copolymer employed.

The ABS part material also has particle sizes and particle size distributions as discussed above. In some embodiments, the resulting ABS part material may be surface treated with one or more external flow control agents, as discussed above, to increase the powder flow properties of the ABS part material. For example, the ABS part material may be dry blended in a high speed and high shear cyclonic mixing apparatus, preferably at 25° C., with one or more external flow control agents. This uniformly distributes, coats, and partially embeds the flow control agent(s) into the individual particles of the ABS part material, without significantly altering the particle size or particle size distribution.

The formulated ABS part material may then be filled into a cartridge or other suitable container for use with EP engine 12p in system 10. For example, the formulated ABS part material may be supplied in a cartridge, which may be interchangeably connected to a hopper of development station 58. In this embodiment, the formulated ABS part material may be filled into development station 58 for mixing with the carrier particles, which may be retained in development station 58. Development station 58 may also include standard toner development cartridge components, such as a housing, delivery mechanism, communication circuit, and the like.

The carrier particles in development station 58 may be any suitable magnetizable carrier particles for charging the ABS part material, such as carrier particles having strontium ferrite cores with polymer coatings. The cores are typically larger in size than the particles of the ABS part material, such as averaging from about 20 micrometers to about 25 micrometers in diameter. The polymer coatings may vary depending on the Q/M ratios desired for the ABS part material. Examples of suitable polymer coatings include poly(methyl methacrylate) (PMMA) for negative charging, or poly(vinylidene fluoride) (PVDF) for positive charging. Suitable weight ratios of the ABS part material to the carrier particles in development station or cartridge 58 include those discussed above.

Alternatively, development station 58 itself may be an interchangeable cartridge device that retains the supply of the ABS part material. In further alternative embodiments, EP engine 12p itself may be an interchangeable device that retains the supply of the ABS part material.

When the ABS part material is loaded to system 10, system 10 may then perform printing operations with the ABS part material to print 3D parts (e.g., 3D part 80), preferably with a suitable support structure (e.g., support structure 82). For instance, the layers 64s of support structure 82 may be developed from the support material 66s with EP engine 12s and transferred to layer transfusion assembly 20 along with layers 64p of the developed part material 66p, via belt 22. Upon reaching layer transfusion assembly the combined layer 64 (of layers 64p and 64s) are heated and transfused to print 3D part 80 and support structure 82 in a layer-by-layer manner using an additive manufacturing technique.

Compositionally, the resulting 3D part (e.g., 3D part 80) includes the ABS part material, such as the ABS copolymer, charge control agent, heat absorber, flow control agent, and/or any additional additives. Furthermore, the transfusion steps with layer transfusion assembly 20 may provide part densities that are greater than those achievable from ABS copolymers with other fusion-based additive manufacturing techniques, such as the extrusion-based technique developed by Stratasys, Inc., Eden Prairie, Minn., under the trademarks "FUSED DEPOSITION MODELING" and "FDM".

For example, in a direction of the build plane, the resulting 3D part may exhibit a peak tensile stress greater than about 5,000 pounds/square-inch (psi), and more preferably greater than about 5,300 psi. In some embodiments, the 3D part may exhibit a peak tensile stress greater than about 5,800 psi in a direction of the build plane. As used herein, the peak tensile stress is measured pursuant to ASTM D638-10. Accordingly, the printed 3D parts may have high part resolutions and good physical properties (e.g., good part strength, density, chemical resistance, usable temperature ranges, and the like), allowing them to function as end-use parts, if desired.

Property Analysis and Characterization Procedures

Various properties and characteristics of the part and support materials described herein may be evaluated by various testing procedures as described below:

1. Glass Transition Temperature

The glass transition temperature is determined using the classical ASTM method employing Differential Scanning calorimetry (DSC) ASTM D3418-12e1 and is reported in degrees Celsius. The test is performed with a DSC analyzer commercially available under the tradename "SEIKO EXSTAR 6000" from Seiko Instruments, Inc., Tokyo, Japan, with a 10-milligram sample of the support material copolymer. The data is analyzed using software commercially available under the tradenames "DSC Measurement V 5.7" and "DSC Analysis V5.5", also from Seiko Instruments, Inc., Tokyo, Japan. The temperature profile for the test includes (i) 25° C. to 160° C. heating rate 10 Kelvin/minute (first heating period), (ii) 160° C. to 20° C. cooling rate 10 Kelvin/minute, and (iii) 20° C. to 260° C. heating rate 10 Kelvin/minute (second heating period). The glass transition temperature is determined using only the heat flow characteristics of the second heating period (iii).

2. Particle Size and Particle Size Distribution

Particle sizes and particle size distributions are measured using a particle size analyzer commercially available under the tradename "COULTER MULTISIZER II ANALYZER" from Beckman Coulter, Inc., Brea, Calif. The particle sizes are measured on a volumetric-basis based on the D50 particles size, D10 particle size, and D90 particles size parameters. For example, a D50 particle size of 10.0 micrometers for a sample of particles means that 50% of the particles in the sample are larger than 10.0 micrometers, and 50% of the particles in the sample are smaller than 10.0 micrometers. Similarly, a D10 particle size of 9.0 micrometers for a sample of particles means that 10% of the particles in the sample are smaller than 9.0 micrometers. Moreover, a D90 particle size of 12.0 micrometers for a sample of particles means that 90% of the particles in the sample are smaller than 12.0 micrometers.

Particle size distributions are determined based on the D90/D50 distributions and the D50/D10 distributions. For example, a D50 particle size of 10.0 micrometers, a D10 particle size of 9.0 micrometers, and a D90 particle size of 12.0 micrometers provides a D90/D50 distribution of 1.2, and a D50/D10 distribution of 1.1.

As mentioned above, the geometric standard deviation $\sigma_g$ preferably meets the criteria pursuant to the above-shown Equation 1, where the D90/D50 distributions and D50/D10 distributions are preferably the same value or close to the same value. The "closeness of the D90/D50 distributions and D50/D10 distributions are determined by the ratio of the distributions. For example, a D90/D50 distribution of 1.2 and a D50/D10 distribution of 1.1 provides a ratio of 1.2/1.1=1.09, or about a 9% difference.

3. Triboelectric Charging

The triboelectric or electrostatic charging properties of powder-based materials for use in electrophotography-based additive manufacturing systems, such as system 10, may be determined with the following technique. A test sample of 7 parts by weight of the powder-based material is agitated in a clean dry glass bottle with 93 parts by weight of carrier particles. The carrier particles include a magnetized 22-micrometer core of strontium ferrite coated with 1.25% by weight of a polymer coating of poly(methyl methacrylate) (PMMA) for negative charging, or poly(vinylidene fluoride) (PVDF) for positive charging.

The mixture of the powder-based material and the carrier particles is agitated 25° C. on a jar roller for 45 minutes to ensure complete mixing of the carrier particles and the powder-based material, and to ensure equilibration of the Q/M ratios. This mixing simulates the mixing process that occurs in a development station of the electrophotography engine when the part or support materials are added to the carrier particles.

A sample of the mixture is then quantitatively analyzed with a TEC-3 Triboelectric Charge Analyzer (available from Torrey Pines Research, Fairport, N.Y.). This analyzer uses electric fields to strip the electrostatic powder from the carrier particle surface, and a rotating high-strength, planar multi-pole magnet to constrain the (magnetizable or permanently magnetized) carrier beads to a bottom electrode.

A 0.7-gram sample of the mixture (sample powder and carrier particles) is placed onto a clean stainless steel disc, which serves as the bottom electrode in an electrostatic plate-out experiment across a gap, under the influence of an applied electric field. This bottom electrode is mounted and positioned above the rotating multi-pole magnet, and a clean top plate disc electrode is mounted securely above the bottom plate, and parallel to it, so as to provide a controlled gap of 5 millimeters between the top and bottom electrode plates, using insulating polytetrafluoroethylene (PTFE under tradename "TEFLON") spacers at the electrodes' periphery.

If the powder is expected to charge negatively, a direct-current voltage of +1,500 volts is applied across the electrodes, and the magnetic stirrer is activated to rotate at 1500 rpm, so as to gently keep the carrier and powder under test constrained, but also slightly agitated on the bottom electrode, during the measurement. Alternatively, if the powder is expected to charge positively, then a negative bias voltage of −1,500 volts is applied. In either case, the applied electric field causes the powder to strip from the carrier, in the powder/carrier mixture, and to transfer to the top electrode, over a defined time period.

The stripped powder under test is deposited on the top electrode, and the induced accumulated charge on the top plate is measured using an electrometer. The amount of powder transferred to the top electrode is weighed, and compared to the theoretical percentage in the original carrier powder mix. The carrier remains on the bottom plate due to the magnetic forces constraining it.

The total charge on the top plate and the known weight of transferred electrostatic powder are used to calculate the Q/M ratio of the test powder, and to also check that all the electrostatic powder has transferred from the carrier, according to the theoretical amount originally mixed with the carrier beads. The time taken for complete powder transfer to the top plate, and the percent efficiency of the powder transfer process are also measured.

4. Powder Flowability

As discussed above, the part and support materials of the present disclosure preferably exhibit good powder flow properties. This reduces or prevents blockage or flow restrictions of the part or support material during the replenishment feeding, which can otherwise inhibit the supply of the part or support material to the carrier particles in the development station. The powder flowability of a sample material is qualitatively measured by visually observing the flowability of the powder in comparison to commercially-available toners utilized in two-dimensional electrophotography processes, which are rated as having "good flow" or "very good flow".

5. Melt Rheology

Preferably, the melt rheologies of the part and support materials are substantially the same as the melt rheologies of their respective copolymers, and are preferably not detrimentally affected by the other additives. Additionally, as discussed above, the part and support materials for use with electrophotography-based additive manufacturing systems (e.g., system 10) preferably have similar melt rheologies.

Melt rheologies of the part and support materials of the present disclosure, and their respective copolymers, are measured based on their melt flow indices over a range of temperatures. The melt flow indices are measured using a rheometer commercially available under the tradename "SHIMADZU CFT-500D" Flowtester Capillary Rheometer from Shimadzu Corporation, Tokyo, Japan. During each test, a 2-gram sample is loaded to the rheometer pursuant to standard operation of the rheometer, and the temperature of the sample is increased to 50° C. to cause a slight compacting of the sample.

Figure 5:
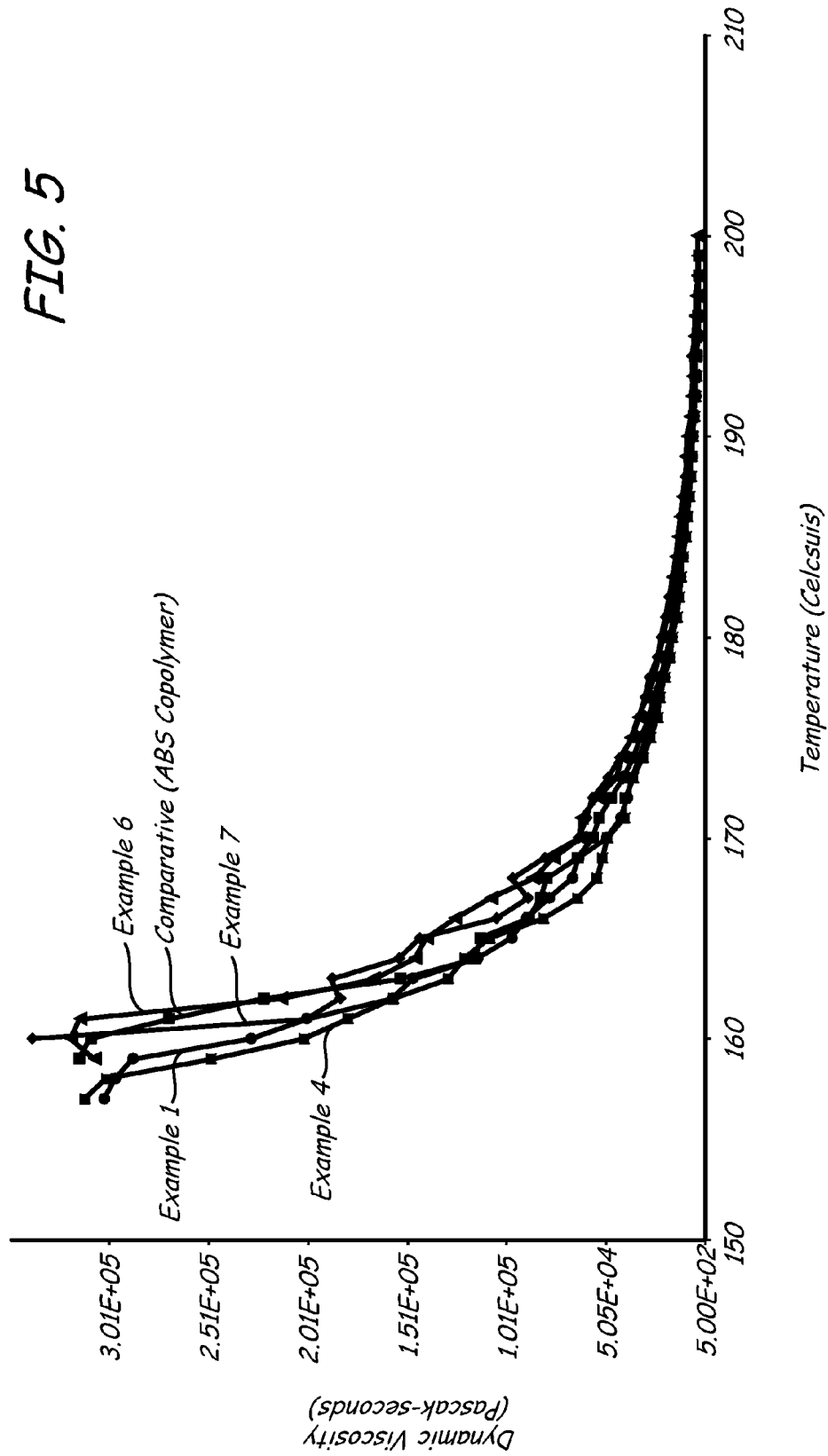
FIG. 5 is a plot of dynamic viscosity versus temperature for example part materials of the present disclosure, illustrating melt rheology behaviors of the part materials.

The temperature is then increased from 50° C. at a rate of 5° C. per minute, allowing the sample to first soften and then flow. The rheometer measures the sample viscosity using the flow resistance of the melt to flow through a small die orifice, as a piston of the rheometer is driven through a cylinder. The rheometer records the softening point, the temperature at which flow begins, and the rate at which flow increases as a result of the temperature increase, until the cylinder is exhausted of sample melt. The rheometer also calculates the apparent viscosity in Pascal-seconds at each temperature point in the ramp. From this data, the apparent viscosity versus temperature profile can be determined, such as shown in FIG. 5, for example.

EXAMPLES

The present disclosure is more particularly described in the following examples that are intended as illustrations only, since numerous modifications and variations within the scope of the present disclosure will be apparent to those skilled in the art.

1. Example 1

An ABS part material of Example 1 was produced using a limited coalescence process, which included an ABS copolymer, but did not include any charge control agent, flow control agent, or infrared absorber. The ABS copolymer was dissolved in an organic solvent (ethyl acetate) to a concentration of 15% by weight.

Separately, a buffered acidic aqueous solution was prepared containing colloidal silica and poly (adipic acid-co-methylaminoethanol. The pH was adjusted to pH 4.0 using dilute hydrochloric acid. The solvent solution was then added slowly to the buffered acidic aqueous solution while subjecting the whole mixture to high shear mixing with a homogenizer. This created droplets of the organic phase of controlled size and size distribution, which were stabilized by the colloidal silica in the aqueous phase.

The organic phase droplet size was targeted to deliver a final size of the dry ABS part material of 11 micrometers. The stabilized solvated droplet suspension was then passed to a flash evaporator, where the organic solvent was removed to a condensate tank using applied vacuum.

The solid particles of the resulting ABS part material, which remained dispersed in the aqueous phase, were then transferred to a stirred holding vessel. A 0.1% sodium hydroxide solution was then added to remove the colloidal silica. The resulting aqueous slurry was then pumped through a particle filtration device and washed on the filter with 0.1% sodium hydroxide, followed by demineralized water, to remove any remaining colloidal silica particles.

The resultant colorless ABS part material, which did not include any charge control agent, flow control agent, or infrared absorber, was then dried using hot air in a tray drying apparatus, which produced a 94% yield relative to the original amount of the ABS copolymer, and a particle size and particle size distribution as listed below in Table 1.

TABLE 1

| Particle Size/Particle Size Distribution | Example 1 |
| --- | --- |
| D50 Particle Size (micrometers) | 10.42 |
| D90 Particle Size (micrometers) | 13.02 |
| D10 Particle Size (micrometers) | 8.92 |
| D90/D50 Distribution | 1.25 |
| D50/D10 Distribution | 1.14 |

2. Example 2

An ABS part material of Example 2 was produced using the same limited coalescence process as discussed above for Example 1 where the ABS part material of Example 2 included a charge control agent (zinc complex of di-t-butyl salicylate) in addition to the ABS copolymer, but did not include any flow control agent or infrared absorber. The limited coalescence process followed the same steps as discussed above for Example 1, where the charge control agent was also added to the organic solvent with the ABS copolymer.

The resulting powder of the ABS part material included the ABS copolymer and 1% by weight of the charge control agent. This produced a 93% yield relative to the original amount of the ABS copolymer, and a particle size and particle size distribution as listed below in Table 2.

TABLE 2

| Particle Size/Particle Size Distribution | Example 2 |
| --- | --- |
| D50 Particle Size (micrometers) | 11.69 |
| D90 Particle Size (micrometers) | 13.95 |
| D10 Particle Size (micrometers) | 9.66 |
| D90/D50 Distribution | 1.19 |
| D50/D10 Distribution | 1.21 |

3. Example 3

An ABS part material of Example 3 was produced using the same limited coalescence process as discussed above for Example 1 where the ABS part material of Example 3 included another charge control agent (chromium complex of di-t-butyl salicylate) in addition to the ABS copolymer, but did not include any flow control agent or infrared absorber. The limited coalescence process followed the same steps as discussed above for Example 1, where the charge control agent was also added to the organic solvent with the ABS copolymer.

The resulting powder of the ABS part material included the ABS copolymer and 1% by weight of the charge control agent. This produced a 93% yield relative to the original amount of the ABS copolymer, and a particle size and particle size distribution as listed below in Table 3.

TABLE 3

| Particle Size/Particle Size Distribution | Example 3 |
| --- | --- |
| D50 Particle Size (micrometers) | 11.49 |
| D90 Particle Size (micrometers) | 13.77 |
| D10 Particle Size (micrometers) | 9.46 |
| D90/D50 Distribution | 1.20 |
| D50/D10 Distribution | 1.21 |

4. Example 4

An ABS part material of Example 4 was produced using the same limited coalescence process as discussed above for Example 1 where the ABS part material of Example 4 included the charge control agent of Example 2 (zinc complex of di-t-butyl salicylate) and carbon black infrared absorber, in addition to the ABS copolymer, but did not include any flow control agent.

The limited coalescence process followed the same steps as discussed above for Example 1, where the charge control agent and the carbon black were also added to the organic solvent with the ABS copolymer. In particular, the carbon black was commercially available under the tradename "REGAL 330" from Cabot Corporation, Boston, Mass., and was passed through a microfluidizer for dispersion into the organic solvent solution. Additionally, the organic phase droplet size was targeted to deliver a final size of the dry ABS part material of 12 micrometers.

The resulting powder of the ABS part material included the ABS copolymer, 1% by weight of the charge control agent, and 2.5% by weight of the carbon black. This produced a 97% yield relative to the original amount of the ABS copolymer, and a particle size and particle size distribution as listed below in Table 4.

TABLE 4

| Particle Size/Particle Size Distribution | Example 4 |
| --- | --- |
| D50 Particle Size (micrometers) | 12.09 |
| D90 Particle Size (micrometers) | 14.38 |
| D10 Particle Size (micrometers) | 10.00 |
| D90/D50 Distribution | 1.19 |
| D50/D10 Distribution | 1.21 |

5. Example 5

The ABS part material of Example 4 was further subjected to sieving through a 300-micrometer mesh and classification using a classifier operating at 13,000 rpm, where the classifier was commercially available from Hosokawa Micron Ltd., Cheshire, England. After sieving and classification, the resulting yield was 92% relative to the original amount of the ABS part material subjected to the sieving and classification. The resulting particle size and particle size distribution as listed below in Table 5.

TABLE 5

| Particle Size/Particle Size Distribution | Example 5 |
|---|---|
| D50 Particle Size (micrometers) | 12.11 |
| D90 Particle Size (micrometers) | 14.20 |
| D10 Particle Size (micrometers) | 10.23 |
| D90/D50 Distribution | 1.18 |
| D50/D10 Distribution | 1.18 |

The resulting ABS part material was then surface treated with a flow control agent, which was a dimethyldichlorosilane-treated fumed silica commercially available under the tradename "AEROSIL R972" from Evonik Industries AG, Essen, Germany. This produced an ABS part material of Example 5 having the ABS copolymer, 1% by weight of the charge control agent, 0.5% by weight of the flow control agent, and 2.5% by weight of the carbon black.

6. Example 6

An ABS part material of Example 6 was produced using the same limited coalescence process as discussed above for Example 1 where the ABS part material of Example 6 included the carbon black infrared absorber of Example 4, in addition to the ABS copolymer, but did not include any charge control agent or flow control agent. The organic phase droplet size was targeted to deliver a final size of the dry ABS part material of 11 micrometers.

The resulting powder of the ABS part material included the ABS copolymer and 2.5% by weight of the carbon black. This produced a 96% yield relative to the original amount of the ABS copolymer, and a particle size and particle size distribution as listed below in Table 6.

TABLE 6

| Particle Size/Particle Size Distribution | Example 6 |
|---|---|
| D50 Particle Size (micrometers) | 10.52 |
| D90 Particle Size (micrometers) | 12.68 |
| D10 Particle Size (micrometers) | 8.81 |
| D90/D50 Distribution | 1.21 |
| D50/D10 Distribution | 1.19 |

7. Example 7

An ABS part material of Example 7 was produced using the same limited coalescence process as discussed above for Example 1 where the ABS part material of Example 7 included the carbon black infrared absorber of Example 4, in addition to the ABS copolymer, but did not include any charge control agent or flow control agent. In this example, the carbon black concentration was doubled compared to that of Example 6. The organic phase droplet size was targeted to deliver a final size of the dry ABS part material of 12 micrometers.

The resulting powder of the ABS part material included the ABS copolymer and 2.5% by weight of the carbon black. This produced a 93% yield relative to the original amount of the ABS copolymer, and a particle size and particle size distribution as listed below in Table 7.

TABLE 7

| Particle Size/Particle Size Distribution | Example 7 |
|---|---|
| D50 Particle Size (micrometers) | 10.18 |
| D90 Particle Size (micrometers) | 12.30 |
| D10 Particle Size (micrometers) | 8.51 |
| D90/D50 Distribution | 1.21 |
| D50/D10 Distribution | 1.20 |

As shown above in Tables 1-7, the limited coalescence processes used to produce the ABS part materials of Examples 1-7 provided good control of the particle size and particle size distributions, and were largely independent of changes in ABS powder formulation. The particle size medians were within about 0.5 micrometers of the targeted values, and the particle size distributions were within targeted specifications in terms of D90/D50 and D50/D10 distributions. Table 8 shown below provides a summary of the formulations for the part materials of Examples 1-7, where the values are weight percent based.

TABLE 8

| Example | ABS Copolymer | Charge Control Agent | Flow Control Agent | Carbon Black |
|---|---|---|---|---|
| Example 1 | 100.0 | 0.0 | 0.0 | 0.0 |
| Example 2 | 99.0 | 1.0 | 0.0 | 0.0 |
| Example 3 | 99.0 | 1.0 | 0.0 | 0.0 |
| Example 4 | 96.5 | 1.0 | 0.0 | 2.5 |
| Example 5 | 96.0 | 1.0 | 0.5 | 2.5 |
| Example 6 | 97.5 | 0.0 | 0.0 | 2.5 |
| Example 7 | 95.0 | 0.0 | 0.0 | 5.0 |

8. Triboelectric Charging Testing for Examples 1-7

The ABS part materials of Examples 1-7 were subjected to triboelectric charging analysis pursuant to the Triboelectric Charging test described above. Each sample was tested with carrier particles having PMMA coatings, which provided negative charges. Additionally, the sample of Example 1 was also tested with carrier particles having PVDF coatings, which provided positive charges. Table 9 lists the results of the triboelectric charging tests for the ABS part materials of Examples 1-7.

TABLE 9

| Example | Carrier Particles Coating | Q/M Ratio (µC/g) | Transit Time (seconds) | Transit Efficiency |
|---|---|---|---|---|
| Example 1 | PMMA | −28 ± 1 | >360 | 90% |
| Example 1 | PVDF | +24 ± 1 | >300 | 95% |
| Example 2 | PMMA | −22 ± 1 | 120 | 95% |
| Example 3 | PMMA | −25 ± 1 | 120 | 95% |
| Example 4 | PMMA | −18 ± 1 | 45 | 98% |
| Example 5 | PMMA | −27 ± 1 | 30 | 100% |
| Example 6 | PMMA | −12 ± 1 | 60 | 94% |
| Example 7 | PMMA | −9 ± 1 | 60 | 96% |

As shown in Table 9, the Q/M ratios of the ABS part materials are dependent on the types of carrier particles used. Furthermore, the fastest transit times and greatest powder transit efficiencies were achieved using a combination of a charge control agent and carbon black as internal additives, and the flow control agent as a powder flow surface additive (i.e., Example 5).

Moreover, the long term stability of the Q/M ratio and the powder flowability was investigated by exercising the mixture for several hours in a powder development station (e.g., development station 58). As also shown in Table 9, the greatest stability of both the Q/M ratio and the powder flowability was exhibited by the ABS part material of Example 5.

9. Powder Flowability Testing for Examples 1-7

The ABS part materials of Examples 1-7 were also qualitatively measured for powder flowability pursuant to the Powder Flowability test described above. Table 10 lists the results of the powder flowability tests for the ABS part materials of Examples 1-7.

TABLE 10

| Example | Powder Flow Results |
|---|---|
| Example 1 | Very poor flow |
| Example 2 | Poor flow |
| Example 3 | Poor flow |
| Example 4 | Good flow |
| Example 5 | Very good flow |
| Example 6 | Moderate flow |
| Example 7 | Moderate flow |

As shown in Table 10, the ABS part materials of Examples 4-7, which incorporated carbon black, exhibited suitable levels of powder flowability. Particularly, the ABS part material of Example 4 (1% charge control agent and 2.5% carbon black) exhibited good flowability, and the ABS part material of Example 5 (1% charge control agent, 0.5% flow control agent, and 2.5% carbon black) exhibit very good flowability.

Thus, the incorporation of the carbon black and the charge control agent, and more importantly, the flow control agent, may combine to increase the powder flowability of the ABS part materials. As discussed above, this reduces or prevents blockage or flow restrictions of the ABS part material during the replenishment feeding, which can otherwise inhibit the supply of the ABS part material to the carrier particles in the development station.

10. Melt Rheology Testing for Examples 1, 4, 6, and 7

The ABS part materials of Examples 1, 4, 6, and 7 were also tested pursuant to the Melt Rheology test described above to determine whether the additives, such as the charge control agents and the carbon black, had any detrimental effects on the melt rheologies of the ABS copolymer. FIG. 5 is a plot of the resulting dynamic viscosities versus temperature for the tests, where the results of the ABS copolymer feedstock was also tested for comparison.

As shown in FIG. 5, the incorporation of the charge control agent (1% by weight) and the carbon black (2.5% by weight and 5.0% by weight) did not have any significant detrimental effects on the melt rheology of the ABS copolymer. As such, the inclusion of the charge control agent and the carbon black at concentrations shown to be effective for use in electrophotography-based additive manufacturing systems allow the resulting ABS part materials to have melt rheology behaviors that are substantially the same as the ABS copolymer feedstock.

11. Printing Runs for Example 5

The ABS part material of Example 5 was also used to print multiple 3D parts of different geometries, with and without an associated support material, with an electrophotography-based additive manufacturing system corresponding to system 10 (without heater 74). In printing runs with a support material, the support material included a thermoplastic copolymer of styrene-butyl acrylate-methacrylic acid, 2.5% by weight of the carbon black heat absorber, and 1% by weight of the charge control agent, 2.5% by weight of the carbon black heat absorber, and 0.5% by weight of the flow control agent, as described in Example 16 of co-filed U.S. patent application Ser. No. 13/944,478, entitled "Soluble Support Material For Electrophotography-Based Additive Manufacturing" (attorney docket no. 5697.12-0261).

During a given printing run, a digital model of a 3D part was sliced into multiple layers, and support layers were then generated to support overhanging regions of the 3D part. Printing information for the sliced layers was then transmitted to the electrophotography-based additive manufacturing system, which was then operated to print the 3D part.

During the printing run, the ABS part material and the support material were each charged and developed in multiple successive layers with an EP engine of the system, where the development drums was each charged at −500 volts. The charge control agents and the flow control agents were sufficient to develop the layers with good material density. The developed layers were then transferred to an intermediary drums charged at +450 volts, and were then transferred to a transfer belt of the system with biasing rollers charged at +2,000 volts. The part and support material layers were then transferred together to the layer transfusion assembly of the system, where the Q/M ratios of the part and support materials were also sufficient to maintain electrostatic attraction of the developed layers to the belt.

At the pre-heater (corresponding to heater 72), each layer was heated by infrared radiation to temperatures ranging from about 180° C. to about 200° C. The heated layers were then pressed between the nip roller and the reciprocating build platen (with the previously-printed layers of the 3D part), where the nip roller was maintained at a temperature of 200° C., and an average nip pressure of about 40 pounds/square-inch (psi). Each layer successfully transferred from the belt and remained adhered to the top surface of the 3D part/support structure. After passing the nip roller, the top surface of the 3D part/support structure was then heated with a post-heater (corresponding to post-heater 76) to further transfuse the layers, and then cooled down with air jets. This process was then repeated for each layer of the 3D part/support structure.

After the printing run was completed, the 3D part/support structure was removed from the system and exhibited good part resolutions upon visual inspection. The 3D part/support structure was then placed in a support removal system commercially available under the tradename "WAVE-WASH" from Stratasys, Inc., Eden Prairie, Minn. The support removal system subjected the combined 3D part/support structure to an aqueous alkaline solution under agitation for a standard operating duration. Upon completion, the support structure (from the support material of Example 16) was dissolved away from the 3D part of the ABS part material.

Accordingly, the electrophotography-based additive manufacturing system successfully printed 3D parts and support structures from the ABS part material of Example 5 and the support material. This is believed to be due in part to the nearly identical melt viscosity versus temperature profiles, nearly identical glass transition temperatures, and nearly identical triboelectric charging properties of the part and support materials. Furthermore, the layers were developed and transfused at fast printing rates, with good adhesion, allowing the 3D parts and support structures to be printed with short printing durations and thin layers.

Additional 3D parts printed from the ABS part material of Example 5 were also tested for peak stresses to determine their resistance to tensile loads in the build plane. Table 11 lists the peak stresses for four different samples of the ABS part material of Example 5, referred to as Examples 5A-5D.

TABLE 11

| Example | Peak Stress (pounds/square-inch) | Peak Stress (megapascals) |
|---|---|---|
| Example 5A | 6469 | 44.6 |
| Example 5B | 5437 | 37.5 |

TABLE 11-continued

| Example | Peak Stress (pounds/square-inch) | Peak Stress (megapascals) |
|---|---|---|
| Example 5C | 5534 | 38.1 |
| Example 5D | 6048 | 41.7 |

As shown in Table 11, the ABS part material of Example 5 successfully printed 3D parts having good resistance to tensile loads in the build plane. This is believed to be due to the achievable material densities and good transfusion between the successive layers. Moreover, the good transfusion is believed to be due in part to the inclusion of the 2.5% by weight loading of the carbon black infrared absorber, which allowed the ABS part material to be quickly heated with the heaters to transfuse the layers together.

Although the present disclosure has been described with reference to preferred embodiments, workers skilled in the art will recognize that changes may be made in form and detail without departing from the spirit and scope of the disclosure.

The invention claimed is:

1. A powder form part material comprising:
a copolymer in powder form, the copolymer configured to transfuse a layer of part material to at least one additional layer of part material also comprising the copolymer;
a charge control agent in powder form; and
wherein the part material is configured for use in a electrophotography-based additive manufacturing system having a layer transfusion assembly for printing the three-dimensional parts in a layer-by-layer manner.

2. The part material of claim 1, and further comprising a heat absorber in powder form.

3. The part material of claim 1, wherein the copolymer comprises aromatic units comprising styrene units.

4. The part material of claim 1, wherein the heat absorber is an infrared absorber.

5. The part material of claim 1, wherein the infrared absorber is selected from the group consisting of carbon black, anthraquinone dyes, polycyanine dues, metal dithiolene dyes and pigments, tris aminium dyes, and mixtures thereof.

6. The part material of claim 1, wherein the copolymer comprises an acrylonitrile-butadiene-styrene (ABS) copolymer.

7. The part material of claim 1, wherein the charge control agent is selected from the group consisting of chromium oxy carboxylic acid complexes, zinc oxy carboxylic acid complexes, aluminum oxy carboxylic acid complexes, and mixtures thereof.

8. A powder part material for printing three-dimensional parts with an electrophotography-based additive manufacturing system, the part material comprising:
a copolymer in powder form;
a charge control agent in powder form constituting from about 0.1% by weight to about 5% by weight of the part material;
wherein the part material is configured for use in the electrophotography-based additive manufacturing system having a layer transfusion assembly for printing the three-dimensional parts in a layer-by-layer manner.

9. The part material of claim 8, and further comprising a flow control agent constituting from about 0.1% by weight to about 10% by weight of the part material.

10. The part material of claim 9, wherein the charge control agent is selected from the group consisting of chromium oxy carboxylic acid complexes, zinc oxy carboxylic acid complexes, aluminum oxy carboxylic acid complexes, and mixtures thereof.

11. The part material of claim 8, and further comprising a heat absorber constituting from about 0.5% by weight to about 10% by weight of the part material.

12. The part material of claim 11, wherein the heat absorber is an infrared absorber selected from the group consisting of carbon black, anthraquinone dyes, polycyanine dues, metal dithiolene dyes and pigments, tris aminium dyes, and mixtures thereof.

13. The part material of claim 8, wherein the copolymer is an acrylonitrile-butadiene-styrene (ABS) copolymer.

14. A method for printing a three-dimensional part with an electrophotography-based additive manufacturing system, the method comprising:
providing a powder form part material comprising a copolymer and a charge control agent to the electrophotography-based additive manufacturing system;
electrically charging the part material;
developing a layer of the three-dimensional part from the charged part material with the electrophotography-based additive manufacturing system;
electrostatically attracting the developed layer; and
moving the attracted layer to a previously-developed layer.

15. The method of claim 14 and further comprising transfusing the moved layer to the previously-printed layer of the three-dimensional part.

16. The method of claim 14, wherein the copolymer comprises an acrylonitrile-butadiene-styrene (ABS) copolymer.

17. The method of claim 14, wherein the part material further comprises a heat absorber.

18. The method of claim 17, wherein the heat absorber is an infrared absorber selected from the group consisting of carbon black, anthraquinone dyes, polycyanine dues, metal dithiolene dyes and pigments, tris aminium dyes, and mixtures thereof.

19. The method of claim 14, wherein the part material further comprises a flow control agent.

20. The method of claim 14, wherein the charge control agent is selected from the group consisting of chromium oxy carboxylic acid complexes, zinc oxy carboxylic acid complexes, aluminum oxy carboxylic acid complexes, and mixtures thereof.

* * * * *